C. D. EATON.
OIL GAUGE.
APPLICATION FILED MAR. 25, 1921.
1,413,836.
Patented Apr. 25, 1922.
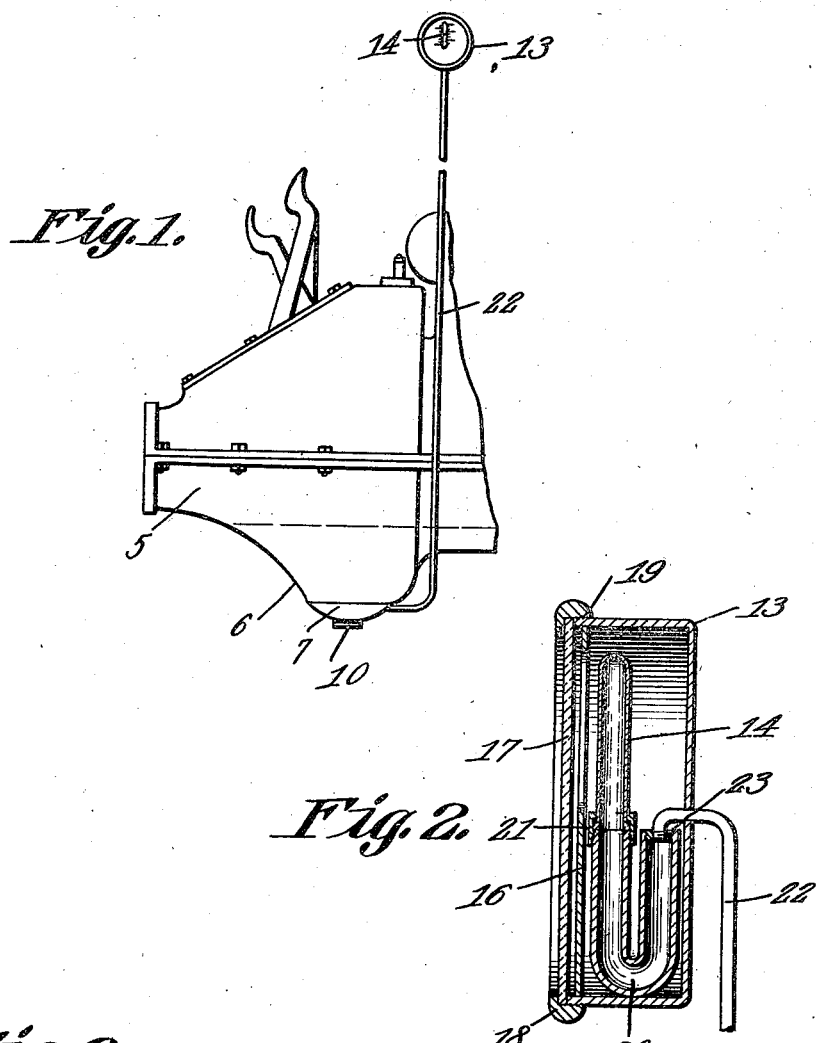
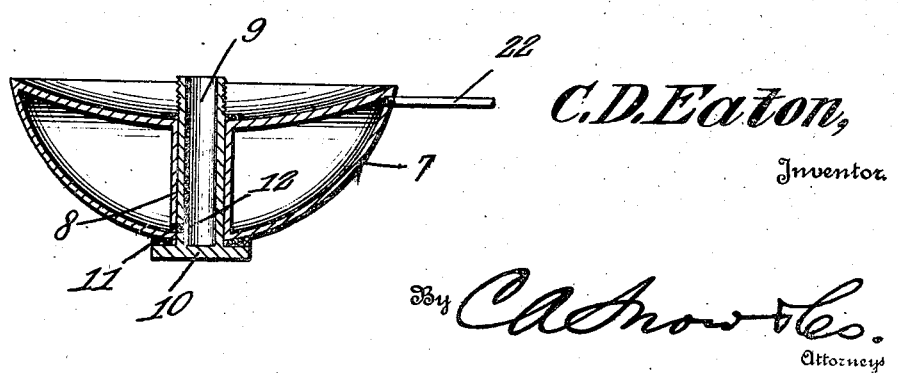

UNITED STATES PATENT OFFICE.

CLARENCE D. EATON, OF KANSAS CITY, MISSOURI.

OIL GAUGE.

1,413,836.  Specification of Letters Patent.  Patented Apr. 25, 1922.

Application filed March 25, 1921. Serial No. 455,672.

*To all whom it may concern:*

Be it known that I, CLARENCE D. EATON, a citizen of the United States, residing at Kansas City, in the county of Jackson and State of Missouri, have invented a new and useful Oil Gauge, of which the following is a specification.

This invention relates to oil gauges, and more particularly to oil gauges especially adapted for indicating the level of the oil within the crank casing of a motor vehicle.

The object of the invention is to provide a gauge of this character which will be controlled by the oil pressure at the bottom of the crank casing caused by the quantity of oil therein, to insure the accurate registering of the device.

A further object of the invention is to provide a gauge which will be located on the instrument, in full view of the operator, so that the operator may at a glance determine the oil level in the crank casing.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a side elevational view of a part of an engine showing the invention as applied thereto.

Figure 2 illustrates a sectional view through the indicator tube housing.

Figure 3 illustrates a fragmental sectional view of the air chamber forming a part of the invention.

Referring to the drawing in detail, the reference character 5 designates the crank casing of a motor which has a lower depressed portion 6 providing the oil reservoir of a motor equipped with the splash lubricating system.

The invention embodies an oil chamber 7 which has its upper surface shaped to conform to the curvature of the lower portion of the crank casing or depressed portion 6, the chamber 7 being provided with a central opening 8 designed to accommodate the shank 9 of the hollow screw 10, the screw being provided to secure the oil chamber 7 to the crank casing.

The opening 8 as before stated, extends centrally to the oil chamber 7, the wall thereof being provided with a lateral opening 11 to register with the lateral opening 12 formed in the hollow shank 9 of the screw 10, so that communication between the oil chamber 7 and crank casing 6, is established.

Mounted in the instrument board of the vehicle, is a housing 13, which houses the indicating tube 14, the front wall of the housing being indicated at 16, is provided with an opening disposed directly in front of the tube 14 to permit the oil level within the tube 14 to be readily observed.

The housing is also provided with a removable cover 17 formed preferably of glass, it being understood that any suitable transparent material may be employed for accomplishing this result, and as shown this cover 17 is secured to the housing as by means of the securing ring 18 that has a flange contacting with the cover 17, the threaded portion 19 of the ring cooperating with suitable threads of the housing, whereby the cover may be secured to the housing.

A substantially U-shaped tube 20 is also positioned within the housing and has one of its ends connected with the tube 14, as by means of the collar 21, the opposite end of the U-shaped tube being connected with the upper end of the tube 22, as by means of the plug 23. From the foregoing it will be seen that since the tube 22 has connection with the oil chamber 7, communication is established between the tube 14 and oil chamber 7.

In the operation of the device, when oil is placed in the crank casing 6, certain portions thereof pass into the chamber 7 causing an air pressure to be set up in the tube 22 which in turn acts on the column of oil in the inverted U-shaped oil tube 20, and which forces the oil into the tube 14.

It is obvious that as the oil is used from the crank casing 6, the air pressure in the tube 22 is reduced. It follows that the oil in the tube 14 drops, indicating that the oil within the crank casing 6 should be replenished.

Having thus described the invention, what is claimed as new is:—

1. In a device of the character described comprising in combination with a crank casing having a drain opening, an oil pressure chamber having a central opening, a hollow screw passing through the central opening and adapted to be secured within the drain opening of the crank casing, said hollow screw providing communication between the oil pressure chamber and the interior of the crank casing.

2. In combination with a crank casing having a lower curved portion disposed adjacent to the drain opening thereof, an oil pressure chamber having an upper concaved wall adapted to accommodate the curved portion of the crank casing, a hollow screw passing through the oil pressure chamber and adapted to be positioned in the drain opening of the crank casing to secure the oil pressure chamber to the crank casing, said screw adapted to provide communication between the crank casing and oil pressure chamber.

In testimony that I claim the foregoing as my own, I have hereto affixed my signature in the presence of two witnesses.

CLARENCE D. EATON.

Witnesses:
ALBERT E. SMITH,
W. E. SMITH.